Figure 1:
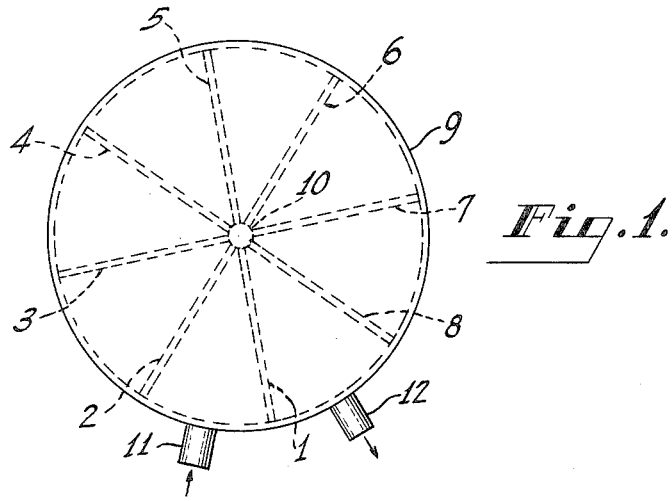

INVENTOR:
HARRY W. WEBER, JR.
ATTORNEYS

United States Patent Office 3,235,342
Patented Feb. 15, 1966

3,235,342
BAFFLE-KETTLE REACTOR
Harry W. Weber, Jr., Baltimore, Md., assignor to FMC Corporation, New York, N.Y., a corporation of Delaware
Filed Oct. 2, 1962, Ser. No. 227,844
2 Claims. (Cl. 23—285)

This invention relates to a method and apparatus for the continuous reaction of a fluid mass in which a gas is evolved.

Continuous reactions are conventionally carried out in tube, tower, and occasionally kettle reactors. The problems arising from reactions which are to be maintained in a heterogeneous reaction mass, particularly a liquid-solid reaction mass, which are reversible in nature and from which a by-product gas is evolved are beyond the normal operation of these known reactors.

It is well known that in a kettle reactor, an unduly long residence time is usually required to obtain high conversion. In a tube reactor, the reaction product is in continual contact with any evolved gas throughout the completely enclosed path. This contact may cause reversal of the reaction and substantial loss in product. Countercurrent flow tower reactors, while ideal for reversible, liquid-phase reactions evolving a by-product gas, are poorly suited for reversible liquid-solid reactions evolving by-product gases, since the solid reactant tends to gravitate through the unit more rapidly than it is consumed by reaction. Attempts to increase the residence time of the solids will, in most cases, lead to uneconomical reactor design. In concurrent flow, the product is withdrawn with reaction by-products, as in the tube reactor, resulting in reversal of the desired reaction.

Each of these types of reactors, however, has its peculiar advantage. In the kettle reactor, the large vapor space is desirable for removing evolved gas. In the tube reactor and tower reactor, a continuous "slug-flow" type of mass transfer is possible, thereby minimizing back mixing (the intermingling of a portion of material charged into a reactor with a portion newly introduced). The residence time of the moving reactants may be effectively controlled to ensure complete reaction.

The object of this invention, therefore, is to provide a reaction vessel for a continuous reversible reaction of a liquid or slurried mass in which a gas must be removed. Another object is to provide a reaction vessel permitting a continuous flow with minimal back mixing of reactants.

I have discovered a novel reaction vessel suitable for continuous reactions requiring both extended reaction times and progressive removal of an evolved gas, which directs the flow of the reaction mass through a series of tortuous upward and downward paths in separate compartments wherein the evolved gas is removed at each upward flow through a common vapor space above the compartments.

The problem of removing a gas which is evolved during a reversible reaction from a fluid reaction mass or one carried in a liquid medium is eliminated by continuously passing the mass into my novel reactor containing a plurality of separate vertical compartments, each compartment having an access for the incoming and exit flow of the materials and being open at the top to an overhead vapor space.

According to my invention, the reactor compartments are formed by a number of surfaces of varying lengths disposed along a vertical central axis of a kettle-type reactor, each surface being positioned at specific angular distances to the next succeeding surface. The surfaces extend radially from the vertical axis to the vessel walls. The lengths of the surfaces and their positions on the vertical axis will create the access means for the incoming and exit flow in each compartment and provide a serpentine path for the reacting materials. The upper edges of each surface do not extend to the top of the vessel because the vapor space at the top of the vessel must be common to all compartments. This upper vapor space will function as a common vent for all uncondensed exhaust vapors.

The surfaces, or baffles as they may be alternatively called, are so situated or may be so placed within the vessel with respect to each other, that a continuous non-mixing flow may be directed in a variety of paths throughout the vessel. The mass enters the vessel in one compartment or chamber, and flows out into the next compartment at a different point on the vertical from its point of entry. Preferably, the entry and exit points in each compartment are at opposite edges of adjoining surfaces.

This up-and-down movement of mass can be conducted with or without agitation as desired. A "slug-flow" pattern may be established wherein the material passing into a compartment moves or displaces forward the contents that have already been passed in without substantial intermixing. All reactants may thus go forward in a concurrent stream. The forward stream may, of course, have either turbulent or laminar flow conditions. A preferred modification can be made by introducing one of the reactants into one or more subsequent compartments. Thus, as one reactant moves through its sinuous path, it may be mixed with additional quantities of the other reactant at various points along its path in order to maintain desired concentrations. The flow of the newly introduced reactant, if a gas, is concurrent with or counter-current to the liquid stream, depending upon the particular compartment. If one of the reactants is itself a gas, it may be readily condensed in the overhead vapor space or by a reflux condenser and returned either to the feed compartment or to subsequent compartments.

An apparatus of this nature surprisingly combines all of the advantages of commercial chemical reactors with the added advantage that, in reversible reactions, wherein an evolved gas must be rapidly separated from the reaction mass, the final product is not exposed or subjected to a large accumulation of gases and any contact with the gas is only for a short time. As the reaction mass reaches the overflow point between adjacent compartments, the evolved gas is free to pass into the open vapor space overhead.

Although my apparatus may have the general outer shape of a tank or kettle reactor, by altering the "shape" of the inner space of the reactor with barriers or baffles, it is possible to cause the movement of a liquid or slurried mass to assume the path more closely resembling that of a pipe or tube reactor. The result is that the vapor space of a kettle reactor is available for removal of gases, while the mass of reactants can be mixed in a controlled pattern simulating the concurrent flow of a tube reactor or the countercurrent and concurrent flow of a tower reactor.

Conditions within the reactor, such as temperature, pressure, fluid velocity of the reaction mass, and the path design of the stream as affected by the position of the baffles, may be varied to obtain the desired flow conditions and to minimize the contact between the evolved gas and the reactive components or product in the reaction mass. For example, the reactor may either be jacketed or unjacketed.

Figure 2:
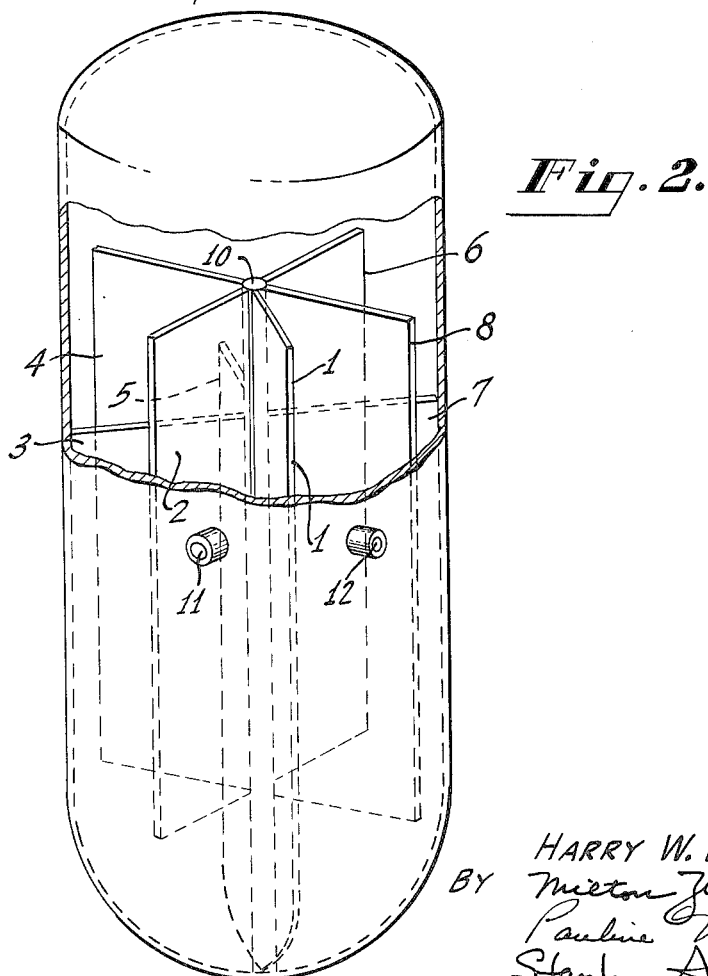

A typical embodiment of the apparatus is illustrated in the accompanying drawings. FIGURE 1 is a top plan view of a reactor according to this invention showing the top edge of the baffles. FIGURE 2 is a fragmentary perspective elevation of the reactor.

FIGURE 1 shows the top edges of the baffles 1 to 8 arranged inside cylindrical reactor 9. All baffles are radially attached to central axis 10 and the inside walls of the reactor. Eight baffles are shown here, but any number may be used and the baffle arrangement may be varied to accommodate liquid reaction masses of various consistencies. Pipes 11 and 12 are used as feed and exit lines, respectively, for the reactor.

FIGURE 2 shows the baffles arranged within the reactor. Baffles 1, 2, 4, 6 and 8 are positioned along the center axis so that the top edges are closest to the top of the reactor. The bottom edges of 2, 4, 6 and 8 are at a specified distance from the bottom of the reactor. Baffles 1, 3, 5, and 7 are so positioned that the bottom edges will be attached to the bottom of the reactor, while the top edges of all but baffle 1 are a desired distance below the top edges of the other baffles. This distance is the zone in which the reaction mass overflows the lower baffles permitting the evolved gas to escape. Only baffle 1 reaches to both top and bottom of the reaction zone.

The utility of this design will be apparent upon following the flow of a typical liquid reaction mass. The mass is introduced into the chamber bounded by baffles 1 and 2. The stream will fill the chamber and flow downward under baffle 2 and enter the next chamber. The flow will then be upward and over the top of baffle 3, under baffle 4, over baffle 5, under baffle 6, over baffle 7, and under baffle 8. The next baffle, No. 1, is the terminus, since there is no access into the next chamber. The mass will then flow out of pipe 12 in this last chamber. The gases, meanwhile, can be continually withdrawn overhead through the common vapor space.

The inner space of the container may be so constructed that the reaction mas may be directed along a relatively simple path, as shown in the drawings, or along one that is more complex. For example, a container may have "inboard" and "outboard" chambers, meaning that a honey-combed arrangement of surfaces can be used. Furthermore, the chambers may also be separated by a horizontal surface, or plate, creating a two-level reactor.

The chambers may be equipped with various fittings, depending upon the nature of the reaction. One reactant may, for example, be initially introduced downwardly as a spray, or one or more chambers may be fitted with additional heating or cooling equipment which permits specific temperature control at various stages of the reaction. Some chambers may be furnished with weirs, plates, or packing if further flow control is desired, such as increasing agitation or contact area. Furthermore, the entire reactor may be operated under pressures other than atmospheric, as desired, for example under a vacuum.

As discussed earlier, it may be preferable for one of the reactants to be introduced "downstream" from the feed chamber into a subsequent chamber or into all chambers simultaneously. The central axis of the reactor may be conveniently used as an inlet pipe for such a purpose by employing a hollow shaft through which a reactant or other material may be introduced into one or more chamebrs. By thus having the inlet at the bottom of each compartment, the upflow may be concurrent and the downflow will be countercurrent. In other words, each compartment may be designed to have different conditions from those of the other compartments. For example, a particular cross-sectional area may be larger or smaller to obtain a certain desired flow effect at any point during the reaction, such as extending or shortening the residence time in that compartment. The novel compartmented reactor may be looked upon, therefore, as either a single reactor or a number of different vertical reactors within a single container.

This novel reactor is particularly adapted to handle a reaction mass containing miscible or immiscible liquid reactants or solid reactants carried in a liquid carrier or gas-liquid or gas solid reactants, wherein an undesirable gas by-product must be removed. Such reactions as the synthesis of phosphates by the solvolysis reaction or the phosgenation of diamines to produce isocyanates are examples of processes applicable in this invention.

Having described and explained this invention so that it may be practiced by those skilled in the art, including such obvious modifications thereof which could not be practiced without such description or explanation, I claim:

1. A reaction vessel for continuously conducting a reversible fluid phase reaction in which a by-product gas is evolved with a minimum of back-mixing while continuously removing the evolved gas as it is formed which comprises a kettle reactor having a plurality of inner vertical compartments formed by a plurality of inner vertical surfaces extending radially from a central vertical axis to the sides of the reactor, the upper edges of said vertical surfaces not extending to the top of the reactor, thereby providing a vapor space at the top of the reactor which is common to all compartments, alternate vertical surfaces extending to the bottom of the reactor, and the other vertical surfaces not extending to the bottom of the reactor, the upper edges of the vertical surfaces which extend to the bottom of the reactor being lower than those of the vertical surfaces which do not extend to the bottom of the reactor; and an inlet and an outlet means in adjacent compartments, the common vertical surface between said adjacent compartments extending to the bottom of the reactor and the upper edge thereof extending higher than other vertical surfaces which extend to the bottom of the reactor; said reactor being so designed that fluid reactants entering the reactor pass sequentially through a series of tortuous upward and downward movements, whereby gases evolved during the reaction pass into the vapor space at each upward movement.

2. The reaction vessel of claim 1 in which the central vertical axis is an inlet means for passing additional amounts of any reactant into said inner vertical compartments.

References Cited by the Examiner
UNITED STATES PATENTS

| | | | |
|---|---|---|---|
| 1,146,142 | 7/1915 | Ellis | 23—284 X |
| 2,212,932 | 8/1940 | Fairlie | 23—283 X |
| 2,419,245 | 4/1947 | Arveson. | |
| 2,443,758 | 6/1948 | Amos et al. | 23—283 |

MORRIS O. WOLK, Primary Examiner.

JAMES H. TAYMAN, Jr. Examiner.